J. HEUSSER.
HOOK FOR USE ON HAY FORKS.
APPLICATION FILED NOV. 23, 1914.
1,159,222.
Patented Nov. 2, 1915.
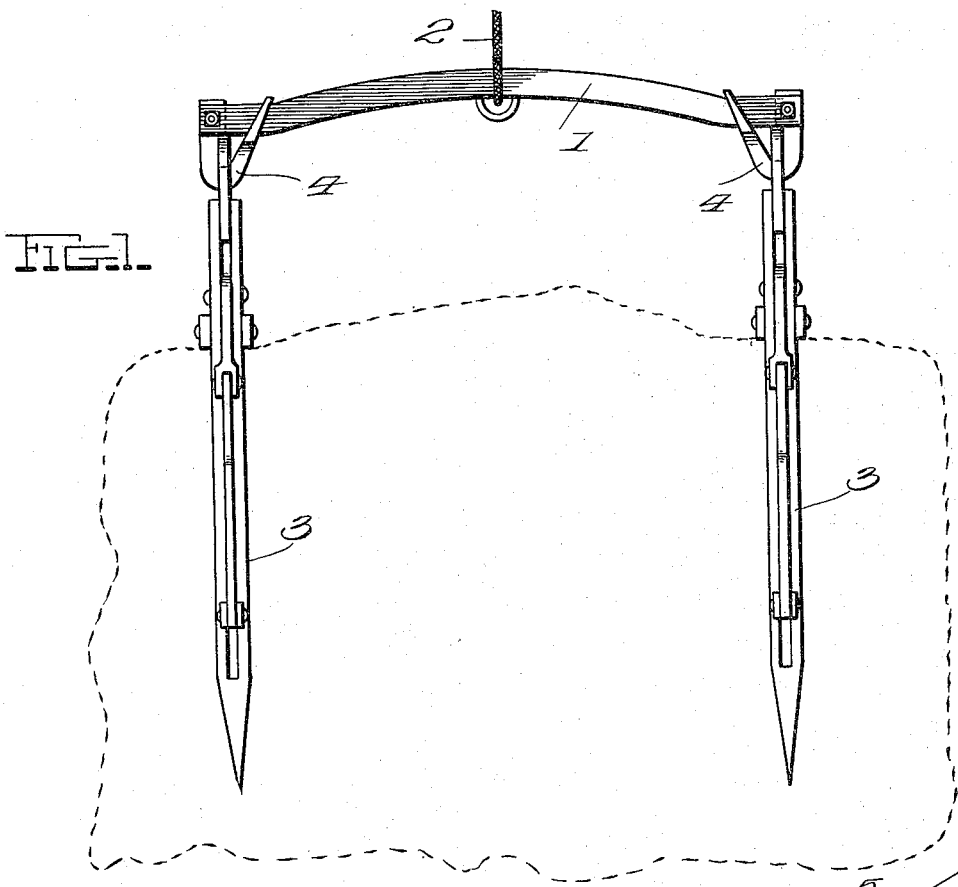
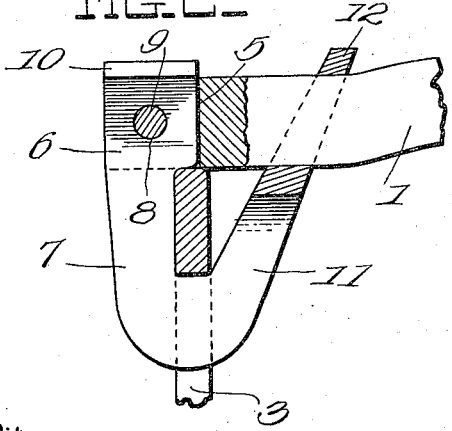
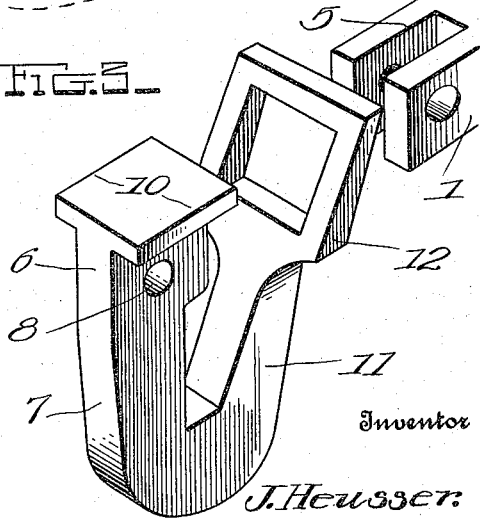
Witnesses
J. R. Pierce
C. Muntzer
Inventor
J. Heusser
By H. B. Willson & Co.
Attorneys

UNITED STATES PATENT OFFICE.

JULIUS HEUSSER, OF MONROE, WISCONSIN.

HOOK FOR USE ON HAY-FORKS.

1,159,222.  Specification of Letters Patent.  Patented Nov. 2, 1915.

Application filed November 23, 1914. Serial No. 873,560.

*To all whom it may concern:*

Be it known that I, JULIUS HEUSSER, a citizen of the United States, residing at Monroe, in the county of Green and State of Wisconsin, have invented certain new and useful Improvements in Hooks for Use on Hay-Forks; and I do declare the following to be a full, clear, and exact description of the invention, such as will enable others skilled in the art to which it appertains to make and use the same.

My invention relates to improvements in hay forks and more particularly to improvements in hooks for use in connection therewith.

The object of the invention is to improve upon the construction of the hook 6 shown in my United States Patent #1,103,287, patented July 14, 1914, to such an extent as to provide a more effective means of connecting the suspending bar 1 with the forks.

In carrying out the above object, I employ the structure hereinafter described and claimed and shown in the drawings wherein:

Figure 1 is a side elevation of a hay fork showing the application of a pair of improved hooks thereto; Fig. 2 is an enlarged vertical section illustrating a side elevation of one of the hooks; and Fig. 3 is a detail perspective view of one of the hooks and one end of the suspending bar.

In these drawings, forming a part of this application, the numeral 1 designates a slightly arched suspending bar which is supported by a cable 2, 3 indicates a pair of forks suspended from the opposite ends of the bar 1, and 4 indicates a pair of the hooks, constituting the subject matter of the present application, these hooks connecting the forks 3 with the bar 1.

As most clearly seen in Figs. 2 and 3, the opposite ends of the bar 1 are provided with longitudinal slots 5 which open through its opposite ends. Fitting snugly within the slots, are the upper ends 6 of the shanks 7 of the hooks 4, said upper ends as well as the bodies of the shanks being flattened as seen in the various figures of the drawings. The upper ends 6 are provided with transverse openings 8 through which and through alined openings in the bar 1, bolts 9 are passed, said upper ends being also provided with bracing flanges 10 on their opposite sides, said flanges being formed above the openings 8 and contacting with the upper sides of the bar 1 when the hooks are in position.

The lower ends of the shanks 7 are curved inwardly and integrally united with the bills 11 of the hooks, said bills inclining upwardly and inwardly in respect to each other, but upwardly and outwardly in respect to the shanks. The upper ends of these bills 11 are widened and flattened as shown, said ends being then provided with rectangular openings which receive the ends of the bar 1, the ends of said bills thereby constituting loops.

By the construction above described and illustrated in the accompanying drawings, it will be seen that although the functions of the hooks are the same as those shown in the patent before mentioned, they are constructed in a much more rigid and durable manner, since the loops 12 prevent the bills 11 from bending downwardy, this having been found to be the most objectionable feature to the hooks shown in said patent.

I claim:

A hook for the purpose set forth comprising an upright shank having a transverse opening near its upper end, longitudinal stop flanges above said opening and formed integrally with opposite sides of the shank, a bill formed integrally with and inclining upwardly and outwardly from the lower end of the shank, and a transverse loop formed integrally with the upper end of the bill, for the purpose set forth.

In testimony whereof I have hereunto set my hand in presence of two subscribing witnesses.

JULIUS HEUSSER.

Witnesses:
 RITA KILGORE,
 FANNIE BEUKERT.

Copies of this patent may be obtained for five cents each, by addressing the "Commissioner of Patents, Washington, D. C."